Patented Nov. 4, 1930

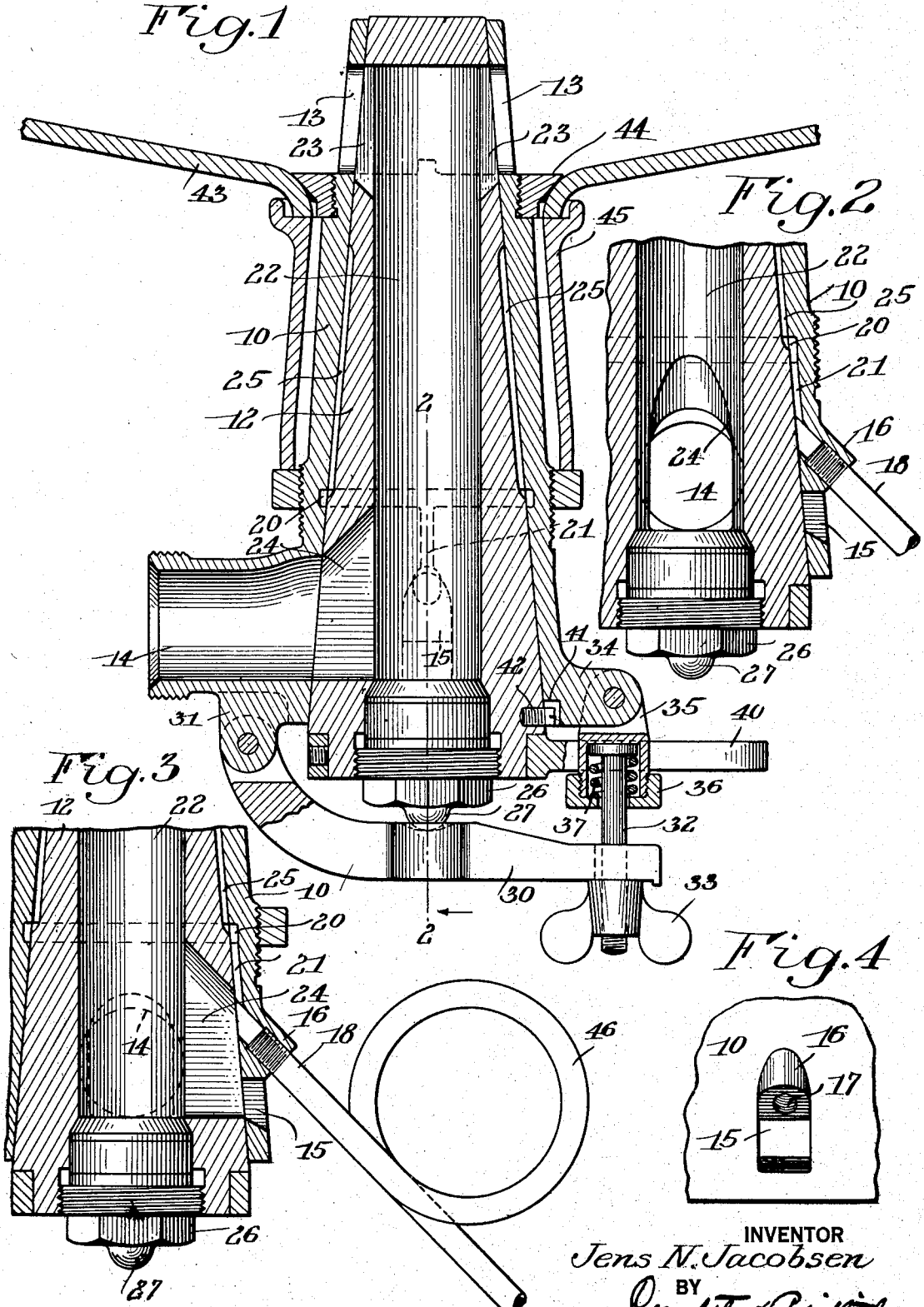

1,780,525

UNITED STATES PATENT OFFICE

JENS N. JACOBSEN, OF ALAMEDA, CALIFORNIA, ASSIGNOR TO THE PFAUDLER COMPANY, OF ROCHESTER, NEW YORK, A CORPORATION OF NEW YORK

SANITARY VALVE

Application filed April 29, 1927. Serial No. 187,656.

This invention relates to valves and particularly to valves provided with means for introducing cleaning or sterilizing fluids thereinto.

During the pasteurization of milk and the treatment of other liquid food products, the liquid is contained in tanks during the treatment and then conducted through suitable conduits or pipes to storage tanks. The pipe lines are usually provided with valves, and in the pasteurizing apparatus a valve is sometimes directly connected to the pasteurizing tank. During the process the valves are, of course, closed and after the process has been completed the valves are opened and the pasteurizing tank is drained. After draining the valves are usually again closed and the tank immediately filled with raw milk. It has been found that some of the raw milk sometimes leaks from the pasteurizing tank to the chamber of the valve attached thereto, and that if it is not removed it will contaminate the milk which passes therethrough after the completion of the next pasteurizing process. Accordingly, it has been proposed to use valves which are provided with drainage ports communicating with the chamber and which are automatically opened to the air when the valves are closed. In this manner provision is made for removing the leakage from the chamber. The mere draining of the chamber, however, does not eliminate all sources of contamination or remove all of the milk, as some of the raw milk and some of the previously pasteurized milk remains as a coating on the walls of the valve chamber, and, if permitted to remain there, may become contaminated from the air which enters through the drainage port. In order to sterilize the walls of the valve chamber, it is proposed to introduce live steam into the chamber automatically when the inlet and outlet ports are closed and the drainage port is opened. It has been found, however, that if live steam is introduced into the chamber immediately the milk may be cooked on the walls of the chamber to form a film of solid substances, and, to avoid this and yet permit the use of live steam for sterilizing the chamber, a flushing fluid, such as warm water, is introduced into the chamber to remove the milk before the steam is introduced.

An object of this invention is to provide a valve which is automatically cleaned when closed. Another object is to provide a valve which is automatically sterilized when closed. Another object is to provide, in combination with a valve, means for automatically successively introducing a cleaning or flushing fluid and a sterilizing fluid into the valve chamber when the valve is closed. Another object is to provide an improved valve structure. Other objects will be in part obvious or in part pointed out hereinafter.

The invention accordingly consists in the features of construction, combinations of elements and arrangements of parts as will be exemplified in the structure to be hereinafter described, and the scope of the application of which will be indicated in the following claims.

In the accompanying drawings in which is shown one of the various possible embodiments of this invention, Figure 1 is a vertical section taken substantially through the center of the valve showing the valve open for the passage of liquid therethrough;

Figure 2 is a fragmentary view taken substantialy on line 2—2 of Figure 1;

Figure 3 is a view similar to Figure 2, but showing the valve plug rotated through ninety degrees; and Figure 4 is a fragmentary view of the valve casing showing the drainage port and the threaded opening for receiving an end of the flushing and sterilizing fluid conduit.

Similar reference characters refer to similar parts throughout the several views of the drawings.

Referring now to the drawings in detail, there is shown a valve comprising a casing 10 and a valve plug 12. The valve plug is substantially frusto-conical in general outline and it is mounted within the casing for rotation about a vertical axis when the valve is in use.

The casing is preferably provided with two oppositely disposed inlet openings or ports 13, an outlet opening or port 14, and a drainage opening or port 15 spaced ninety degrees from the inlet and outlet openings. A projection or lug 16 is formed on the outer surface of the casing above the drainage opening 15 and is provided with an upwardly directed threaded opening 17 which extends completely through the casing wall. The opening 17 receives a threaded end portion of a conduit 18, the structure and function of which will be described later.

The inner wall of the casing above the outlet and drainage openings is provided with an annular recess 20. A groove or recess 21 connects the recess 20 and the opening 17.

The valve plug is provided with a central longitudinally extending recess 22 which forms the chamber in the assembled valve. Inlet openings or ports 23 and an outlet opening 24 communicate with the recess 24 and when the valve is open register with the inlet and outlet openings in the casing and form, with the recess 22, a passage for the liquid. When the valve plug is rotated through ninety degrees, the inlet openings 23 are closed by portions of the casing wall, the inlet openings 13 are closed by portions of the valve plug, the outlet opening 14 is closed by a portion of the valve plug, and the outlet opening 24 communicates with the openings 15 and 17. Thus, when the valve is closed to the passage of liquid therethrough, the chamber is open to permit any liquid contained therein to flow out and to permit flushing and sterilizing fluids to be introduced thereinto.

The valve plug is provided with grooves 25 extending longitudinally thereof from points adjacent the inlet openings to the annular recess 20. Any fluid which enters between the valve plug and the casing is received by the grooves 25 and conducted to the recess 20 from where it is conducted by the groove 21 to a point adjacent the opening 17. The open end of the recess 22 is normally closed by a tight-fitting removable plug 26 which carries a centrally disposed rounded projection 27.

A locking lever 30 is pivotally attached adjacent one end to a lug or projection 31 mounted on the valve casing, and has a recess for receiving the projection 27. The lever 30 is adapted to extend over the valve plug and engage the projection 27 for holding the valve plug in position in the casing. Locking means for holding the lever 30 in engagement with the projection 27 comprise a flat-headed screw member 32 which is yieldingly supported on the casing and carries a wing nut 33. The member 32 is adapted to enter an open end slot in the free end of the lever 30, and the wing nut 33 is adapted to engage the under surface of the said lever.

Means for supporting the member 32 comprise a projection 34 which may be formed integrally with the casing, an externally threaded recessed member 35 which is pivotally attached to the projection 34, and a collar 36 which is removably mounted on the member 35. The head portion of the screw 32 is positioned within the recess in the member 35 and a helical spring 37 is mounted between the head of the member 32 and the collar 36.

An operating lever 40 for rotating the valve plug has a looped or annular portion rigidly mounted within a recess in an end portion of the valve plug. The valve casing is provided with a recess 41 in which a screw member 42 carried by the valve plug is adapted to travel during the rotation of the valve plug. The member 42 is adapted to engage the end walls of the recess 41 and limit the movement of the valve plug.

In Figure 1 the assembled valve is shown attached to the bottom wall of a tank 43. Locking collars 44 and 45 which are threaded on the valve casing engage the inner and outer surfaces of the flanged rim portion of an opening in the bottom wall of the tank and hold the assembled valve securely in position.

The valve illustrated is designed for use in a vertical position as shown. The outlet and drainage openings are so located that any liquid which enters the chamber may readily flow out.

The conduit 18 is provided with a coil 46 which serves as a steam condensing coil and a trap for the condensate. Any suitable trap may be substituted for the coil 46, or any suitable number of turns may be used in the coil. The coil or trap should be of such a size and so positioned that, during the time the conduit is closed to the passage of steam therethrough, sufficient water will be collected to thoroughly flush the valve chamber.

When the valve is open for the passage of liquid therethrough the conduit 18 is closed by the valve plug. Thus, it is possible to allow the conduit 18 and coil 46 to remain continuously in communication with a source of steam supply and to regulate the flow of steam therethrough by means of the valve plug. When the valve plug is rotated to such a position that the outlet opening 24 communicates with the drainage opening 15 and the opening 17, the conduit 18 is automatically brought into communication with the valve chamber. The condensate contained in the trap or coil 46 will be forced upwardly into the chamber ahead of the steam and will serve to flush or wash the milk from the walls thereof, and prevent its being cooked on the walls by the steam which follows immediately. The condensate flows from the chamber through the drainage opening, carrying the milk solids and the steam continues to enter the chamber during the time the valve is closed.

When the valve is open, steam may enter between the valve plug and the casing through the grooves or recesses 20, 21 and 25 and the pressure may be sufficient to prevent leakage from the tank. The steam will also condense in the grooves between the valve plug and the casing, forming deposits of water therein, which, when the valve is subsequently closed, will serve to dilute any milk which passes downwardly between the valve plug and casing sufficiently that it may readily flow to the groove 21. The quantity of milk which leaks downwardly between the valve plug and the casing is normally relatively small and the amount of water contained in the grooves is sufficient to dilute it to such an extent that it cannot form a cake on the surfaces and that the live steam with which it comes in contact at the lower end of the groove 21 will not cause the solids contained therein to be deposited within the chamber.

From the foregoing it will be seen that there is herein provided a structure which embodies the features of this invention and achieves the objects thereof. A sanitary valve structure is provided which is thoroughly efficient and dependable in operation, which is automatically cleaned and sterilized during the normal operation thereof, and by means of which danger of contamination of liquid food products during treatment is substantially eliminated.

As many possible embodiments may be made of the above invention, and as many changes might be made in the embodiment above set forth, it is to be understood that all matter hereinbefore set forth or shown in the accompanying drawings is to be interpreted as illustrative and not in a limiting sense.

I claim as my invention:

1. The combination with a valve provided with a chamber having inlet and outlet ports and an auxiliary port, of a fluid conduit provided with a trap adapted to communicate with said auxiliary port, and means for closing said inlet and outlet ports, opening said auxiliary port, and causing said fluid conduit to communicate with said chamber.

2. A valve comprising a casing provided with inlet and outlet openings and an auxiliary drainage opening, a valve plug having openings adapted to register with the openings in said casing mounted within said casing, and a steam conduit provided with a trap mounted on said casing and adapted to communicate with an opening in said valve plug.

3. A valve comprising a casing provided with inlet and outlet openings and an auxiliary drainage opening, a substantially tubular valve plug provided with openings adapted to register with the openings in said casing rotatably mounted within said casing, and a steam conduit provided with a trap mounted on said casing and adapted to communicate with an opening in said valve plug.

4. A valve comprising a casing provided with inlet and outlet openings and an auxiliary drainage opening, a hollow valve plug having openings adapted to register with the openings in said casing mounted within said casing, and a steam conduit mounted on said casing and communicating with the interior of said casing; said plug being movable from a position in which the openings therein register with the inlet and outlet openings in the casing to a position in which the inlet and outlet openings are closed and one of the openings in said plug registers with the drainage opening in said casing and communicates with the steam conduit.

5. A valve comprising a casing provided with inlet and outlet openings and an auxiliary drainage opening, a hollow valve plug having openings adapted to register with the openings in said casing mounted for rotation about a vertical axis within said casing, and a steam conduit mounted on said casing and communicating with the interior of said casing; said valve plug being rotatable from a position in which the openings therein register with the inlet and outlet openings in the casing to a position in which one of the openings in said valve plug registers with the drainage opening in said casing and communicates with the steam conduit.

6. A valve provided with a chamber having inlet and outlet ports and an auxiliary port, means closing said auxiliary port when said inlet and outlet ports are open and movable to close said inlet and outlet ports and open said auxiliary port, and a fluid conduit provided with a trap mounted on said valve and adapted to communicate with the valve chamber when said auxiliary port is open.

7. The combination with a valve casing having an inlet port, an outlet port, an auxiliary inlet port and an auxiliary outlet port, of a valve plug movably mounted within said casing, said plug having a passageway arranged to establish communication between said inlet and outlet ports when said plug is in one position and to communicate with said auxiliary inlet and outlet ports when said plug is moved to a second position, and means for introducing a sterilizing fluid into said passageway through said auxiliary inlet port when said plug is in said second position.

8. The combination with a valve casing having an inlet port, an outlet port, an auxiliary inlet port and an auxiliary outlet port, of a valve plug movably mounted within said casing, said plug having a passageway arranged to communicate with said inlet and outlet ports and to be out of communication with said auxiliary ports when said plug is in one position, and to be out of communication with said inlet and outlet ports but to communicate with said auxiliary inlet and outlet ports when said plug is moved to a second position, and means for introducing a sterilizing fluid into said passageway through said auxiliary inlet port when said plug is in said second position.

JENS N. JACOBSEN.